United States Patent [19]

Berfield

[11] Patent Number: 4,719,664
[45] Date of Patent: Jan. 19, 1988

[54] SWIVABLE CASTER

[75] Inventor: Robert C. Berfield, Jersey Shore, Pa.

[73] Assignee: Shop-Vac Corporation, Williamsport, Pa.

[21] Appl. No.: 931,714

[22] Filed: Nov. 17, 1986

[51] Int. Cl.$^4$ .............................................. B60B 33/00
[52] U.S. Cl. ............................................ 16/47; 16/38
[58] Field of Search ................... 16/37, 38, 39, 45, 47, 16/48

[56] References Cited

U.S. PATENT DOCUMENTS

| 1,869,966 | 8/1932 | Janda | 16/38 |
| 1,879,429 | 9/1932 | Noelting et al. | 16/38 |
| 3,894,310 | 7/1975 | Screen et al. | 16/47 |
| 3,997,938 | 12/1976 | Pinaire et al. | 16/47 |
| 4,361,930 | 12/1982 | Seesengood | 16/38 |
| 4,544,425 | 10/1985 | Provolo | 16/47 |

Primary Examiner—M. Jordan
Attorney, Agent, or Firm—Ostrolenk, Faber, Gerb & Soffen

[57] ABSTRACT

A swivable caster includes plastic wheel means rotatably mounted on a plastic stem at the lower end thereof. Near its upper end the stem is provided with an annular groove having a nylon split ring disposed therein and having its peripheral portion disposed outside of the groove. This peripheral portion engages a downwardly facing shoulder that extends inward from the internal wall forming a socket that receives the stem. Engagement of the split ring with the shoulder limits insertion of the stem into the socket. During this insertion the split ring is compressed radially so that it acts as a friction means to hold the stem in the socket and also provides a bearing for swiveling of the stem.

18 Claims, 4 Drawing Figures

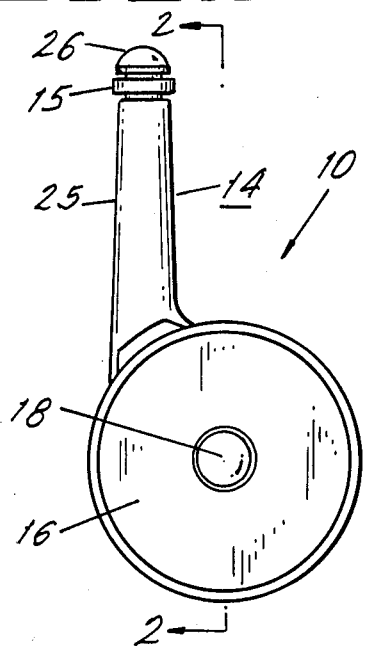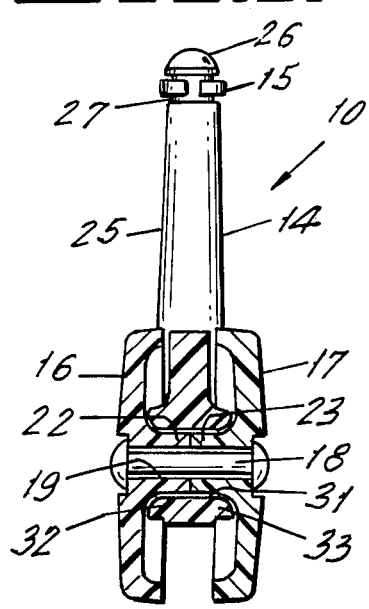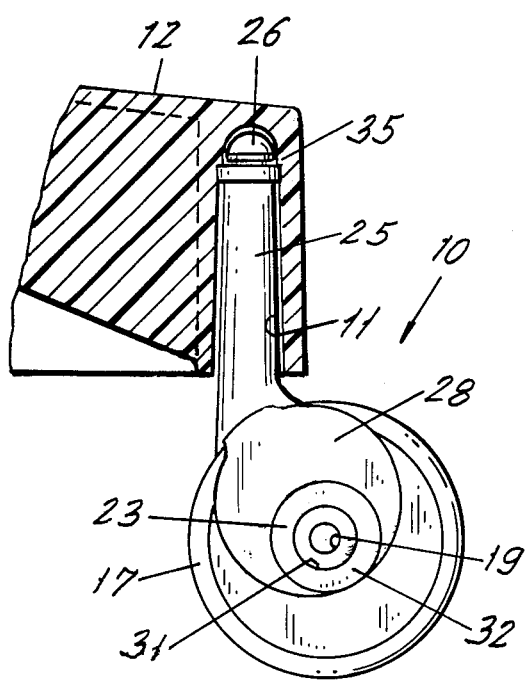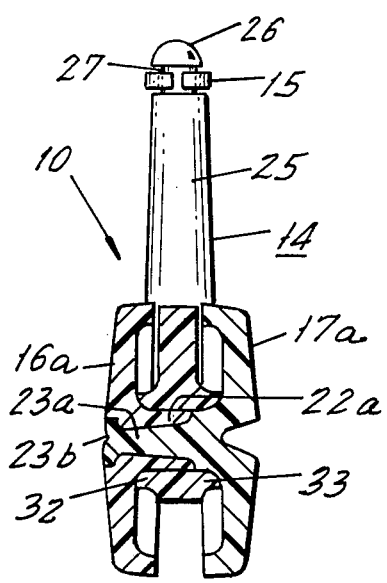

SWIVABLE CASTER

BACKGROUND OF THE INVENTION

This invention relates to caster assemblies for household appliances and the like, and relates more particularly to a caster assembly substantially all of which is constructed of molded plastic elements.

Typical prior art constructions for so-called swivable casters are disclosed in U.S. Pat. No. 3,894,310, issued July 15, 1975 to S. T. Screen for a Twin-wheeled Castor; U.S. Pat. No. 3,822,437 issued July 9, 1974 to S. T. Screen for Castors; U.S. Pat. No. 4,361,930 issued Dec. 7, 1982 to R. E. Seesengood for Caster Socket Assembly; U.S. Pat. No. 4,068,342 issued Jan. 17, 1978 to V. J. Carrier for Castor Support Structure; and British Patent Specification No. 1 533 982 to E. G. Clark for Furniture Glides and Castors, published Nov. 29, 1978.

Castor assemblies of the foregoing patents, as well as other prior art castor assemblies were unnecessarily expensive insofar as labor and/or material costs, and/or were found to have unacceptable short life spans because of force concentrations on elements that were not constructed to withstand such forces. For example, the aforesaid Carrier U.S. Pat. No. 4,068,342, discloses a structure having expensive ball bearings to permit swiveling. This expensive bearing construction is also found in the Seesengood U.S. Pat. No. 4,361,930.

In many prior art constructions, the socket is constructed to provide a wedge like fit that is used to hold the other caster members in assembled relationship. This puts an unnecessary strain on the socket forming part and/or requires that an additional sleeve be interposed between the wall of the socket and a swivable stem that is disposed within the sleeve.

SUMMARY OF THE INVENTION

The instant invention solves the foregoing problems by providing a caster assembly in which the removable unit is constructed essentially of plastic elements and includes an elongated stem having a dome at its upper end, an annular groove just below the dome and a nylon split ring held in the groove with a substantial portion of the ring extending outside of the groove. The stem is received in a socket having a downwardly facing shoulder that is engaged by the split ring to limit insertion of the stem to a point where there is a clearance between the dome and the top of the socket and the stem centered in the socket. There is no contact between the socket wall and the outer surface of the stem. Swiveling of the stem is guided by the split ring.

The stem is a molded plastic member having integrally formed horizontal bearing formations at its lower end which rotatably mount plastic wheel sections that face one another in face-to-face relationship. The wheel sections are mounted to the bearing sections of the stem by a single rivet or by heat staking.

OBJECTS OF THE INVENTION

Accordingly, the primary object of the instant inventin is to provide an economical construction for a swivable caster assembly.

Another object is to provide a novel swivable caster assembly constructed essentially of plastic elements.

Still another object is to provide a novel swivable caster assembly in which the stem and wheel bearings are integrally formed.

A further object is to provide a novel, swivable caster assembly in which with the stem centered in the socket, the wall defining the socket is not in direct contact with the stem.

A still further object is to provide a novel swivable caster assembly in which there is a split nylon ring that bears against an internal shoulder of the socket and defines the swivel axis for the stem.

BRIEF DESCRIPTION OF THE DRAWINGS

These objects, as well as other objects of this invention, shall become readily apparent after reading the following description of the accompanying drawings, in which:

FIG. 1 is a side elevation of the wheeled removable portion of a swivable caster assembly constructed in accordance with teachings of the instant invention.

FIG. 2 is a cross section taken through line 2—2 of FIG. 1 looking in the direction of arrows 2—2.

FIG. 3 is a side elevation of the swivable caster assembly with the socket forming element cross sectioned and the near wheel section together with its securing rivet removed.

FIG. 4 is a cross section similar to that of FIG. 2 of another embodiment of this invention.

DETAILED DESCRIPTION OF THE DRAWINGS

Now referring to the drawings and more particularly to FIGS. 1-3 which illustrate the elements of a swivable caster assembly constructed in accordance with teachings of the instant invention, including subassembly 10 that is removably mounted within elongated vertical socket 11 of mounting member 12. Subassembly 10 consists of stem element 14, wheel sections 16, 17, split ring 15 and rivet 18 which mounts wheel section 16, 17 to stem member 14. Elements 16, 17 are molded of plastic material that differs from the plastic material of element 14, the dissimilar plastic materials being compatible and having good life and bearing qualities. Typically element 14 is constructed of polyethylene, ring 15 of nylon and wheel sections 16, 17 of polystyrene.

Wheel sections 16, 17 have integrally formed bearing hubs 22, 23, respectively, that are centrally located and abut one another in axial alignment. Rivet 18 extends through aligned sections of bore 19 that extend through hubs 22, 23.

Stem element 14 includes elongated vertical stem 25 having dome 26 at its upper end and annular groove 27 immediately below dome 26. The latter provides a tapered surface that spreads split ring 15 gradually to facilitate mounting thereof. At its lower end, stem 25 is provided with offset section 28 that is disposed between wheel sections 16, 17 and is provided with aligned bearing sections 32, 33 that extend in opposite directions from offset section 28. Central aperture 31 through bearing sections 32, 33 receives hubs 22, 23 and in this way wheel sections 16, 17 are rotatable about the horizontal axis defined by bearing projections 32, 33. The upper end of socket 11 is a hemisphere and at the lower end of the hemisphere there is internal shoulder 35 against which the upper end of split ring 15 bears to limit inward travel of stem 25 so that there is a clearance between dome 26 and the upper end of socket 11. Similarly, with split ring 15 bearing against shoulder 35 and stem 25 centered in socket 11, there is no direct contact between stem 25 and the wall defining socket 11.

The embodiment of FIG. 4 includes the same stem element 14 as in FIGS. 1–3, and also includes wheel elements 16a, 17a having respective bearing hubs 22a, 23a that are disposed within aligned bores of bearing sections 32, 33. Hub 22a is provided with a tapered bore through which frusto-conical hub 23a extends. Free end 23b of the latter is spread by heat staking to retain wheel elements 16a, 17a in assembled relationship rotatably mounted to bearing sections 32, 33.

Although the present invention has been described in connection with a plurality of preferred embodiments thereof, many other variations and modifications will now become apparent to those skilled in the art. It is preferred, therefore, that the present invention be limited not only by the specific disclosure herein, but only by the appended claims.

What is claimed is:

1. A caster assembly including:
   a. first means defining a vertically extending socket open at its bottom end and having a downwardly facing annular shoulder at a location substantially above its bottom end;
   b. second means removably mounted to said first means and including an elongated stem, wheel means mounted on said stem at its lower end for rotation about a horizontal axis, a peripheral groove in said stem near its upper end, a split ring entered into said grove and having a peripheral portion projecting outside of said groove;
   c. said stem being entered into said socket through said bottom end with said peripheral portion having its upper surface engaged with said shoulder to limit upward movement of said second means relative to said first means to a position wherein said wheel means is outside of said socket in the vicinity of said bottom end;
   d. said stem having its longitudinal axis generally vertical and being swivable about said longitudinal axis with said split ring providing a bearing for swiveling of said stem.

2. A caster assembly as set forth in claim 1 in which the wheel means includes first and second sections secured together in facing side by side relationship.

3. A caster assembly as set forth in claim 2 in which the said horizontal axis is defined by aligned bearing sections extending in opposite directions from said stem and in operative engagement with first and second hub sections that extend toward one another from the respective first and second sections of said wheel means at the centers thereof.

4. A caster assembly as set forth in claim 3 in which the hub sections are disposed within a horizontal passage of said bearing sections.

5. A caster assembly as set forth in claim 1 in which the wheel means and the first means are constructed of dissimilar compatible plastic materials having good bearing qualities.

6. A caster assembly as set forth in claim 1 in which the split ring is constructed of relatively hard plastic material.

7. A caster assembly as set forth in claim 2 also including a metal fastener securing said first and second sections together in operative relationship.

8. A caster assembly as set forth in claim 3 in which the first hub section extends through the second hub section and has a free end exposed outboard of said second section of said wheel means, said free end being stacked to secure said first and second section of said wheel means together in operative relationship.

9. A caster assembly as set forth in claim 1 in which the upper end of the stem is provided with a dome to facilitate mounting of said split ring on said stem.

10. A caster assembly as set forth in claim 1 in which the upper end of said socket is closed by a dome-like surface which under normal operation is closely spaced from said dome.

11. A caster assembly as set forth in claim 1 in which the horizontal and longitudinal axes are offset and nonparallel to each other.

12. A caster assembly as set forth in claim 3 in which the wheel means and the first means are constructed of dissimilar compatible plastic materials having good bearing qualities.

13. A caster assembly as set forth in claim 12 in which the split ring is constructed of relatively hard plastic material.

14. A caster assembly as set forth in claim 13 in which the upper end of the stem is provided with a dome to facilitate mounting of said split ring on said stem.

15. A caster assembly as set forth in claim 14 in which the upper end of said socket is closed by a dome-like surface which under normal operation is closely spaced from said dome.

16. A caster assembly as set forth in claim 15 in which the horizontal and longitudinal axes are offset and nonparallel to each other.

17. A caster assembly as set forth in claim 3 in which the upper end of the stem is provided with a dome to facilitate mounting of said split ring on said stem.

18. A caster assembly as set forth in claim 17 in which the upper end of said socket is closed by a dome-like surface which under normal operation is closely spaced from said dome.

* * * * *